United States Patent [19]

Jaggard

[11] 3,989,641
[45] Nov. 2, 1976

[54] OLEFINE POLYMERIZATION CATALYST
[75] Inventor: James Frank Robert Jaggard, Bad Kissingen, Germany
[73] Assignee: Imperial Chemical Industries Limited, London, England
[22] Filed: Jan. 20, 1975
[21] Appl. No.: 542,403

[30] Foreign Application Priority Data
Jan. 31, 1974 United Kingdom.................. 4573/74

[52] U.S. Cl............................................. 252/429 B
[51] Int. Cl.²........................................ B01J 31/02
[58] Field of Search................. 252/429 B; 260/93.7

[56] References Cited
UNITED STATES PATENTS
3,554,993   1/1971   Moberly et al.................. 252/429 B
3,580,899   5/1971   Massoubre...................... 252/429 B
3,639,375   2/1972   Staiger et al. ................... 252/429 B

*Primary Examiner*—J. Poer
*Attorney, Agent, or Firm*—Cushman, Darby & Cushman

[57]  ABSTRACT

An olefine polymerization catalyst comprises (1) a solid transition metal compound, (2) an organo-compound of a non-transition metal compound, (3) a tetra-alkyl diamine and (4) a phosphine oxide derivative, wherein one of the compounds (3) and (4) has been milled with the transition metal compound. The catalyst system may optionally include a polyene. The catalyst combines good polymerization activity with a low yield of soluble polymer.

9 Claims, No Drawings

OLEFINE POLYMERIZATION CATALYST

The present invention relates to olefine polymerisation catalysts, methods for the production of such catalysts and olefine polymerisation processes using such catalysts.

Olefine monomers such as ethylene, propylene and butene-1 can be polymerised using catalysts of the type frequently referred to as "Ziegler" catalysts. When propylene is polymerised using such catalysts there is obtained a mixture of crystalline or isotactic polymer and amorphous or atactic polymer. The commercially desirable material is the isotactic polymer and the choice of catalyst used affects the proportion of isotactic polymer which is formed. In order to obtain a high proportion of isotactic polymer, for example in excess of 90% by weight, the catalysts used commercially are of relatively low activity and it is necessary to remove catalyst residues from the polymer. Catalysts giving a higher yield of polymer are found to be less stereospecific and to produce a polymer having an increased proportion of the undesirable atactic polymer.

According to the present invention there is provided an olefine polymerisation catalyst comprising
1. at least one solid compound of a transition metal of Groups IVA to VIA;
2. at least one organo-metallic compound of aluminium or a non-transition metal of Groups IA or IIA;
3. at least one tetra-alkyl diamine of the general formula

where each R, which may be the same or different, is an alkyl group; and
  n is 1, 2 or 3; and
4. at least one phosphorus compound of the general formula

where each R', which may be the same or different, is a dialkylamino group or a hydrocarbyl group; and wherein the component (1) has been modified by grinding it in the presence of at least one of the components (3) and (4).

The catalyst also preferably includes a substituted or unsubstituted polyene.

The transition metal compound is conveniently a halide, particularly a chloride. The transition metal compound can be a compound of zirconium or vanadium such as $ZrCl_4$, $VCl_3$ or $VOCl_2$. However, it is preferred that the transition metal compound is a titanium trihalide, particularly titanium trichloride. The titanium trichloride can be prepared by the reduction of titanium tetrachloride with hydrogen or preferably by the reduction of titanium tetrachloride with aluminium metal or an organo-aluminium compound, and it will be appreciated that the latter forms of titanium trichloride also include aluminium compounds.

The organo-metallic compound which is component (2) of the catalyst is preferably an organo-aluminium compound, particularly an aluminium trihydrocarbyl such as an aluminium trialkyl, for example aluminium triethyl. If desired a mixture of organo-aluminium compounds can be used such as aluminium triethyl and diethyl aluminium chloride, that is a mixture of an aluminium trihydrocarbyl and an aluminium dihydrocarbyl halide.

In the diamine which is component (3) of the catalyst system, the groups R are preferably all the same and may be any suitable alkyl group such as methyl or ethyl and we particularly prefer that the group R is a methyl group. The value of $n$ is preferably 1 or 2.

In the phosphorus compound which is component (4) of the catalyst the groups R' are preferably all the same and a convenient dialkylamino group is the dimethylamino group whilst if R' is a hydrocarbyl group it is preferably an aryl group such as phenyl.

Thus, a preferred catalyst system in accordance with the present invention comprises
1. a titanium trichloride;
2. an aluminium trialkyl compound, especially triethyl aluminium;
3. N,N,N',N'-tetramethylmethylene diamine or N,N,N',N'-tetramethylethylene diamine; and
4. hexamethylphosphoric triamide or triphenylphosphine oxide, and wherein the titanium trichloride has been modified by grinding it in the presence of at least one of the components (3) and (4).

The grinding of component (1) and at least one of the components (3) and (4) is conveniently effected by ball-milling the components, preferably in the dry state. The components may be added to the mill neat or may be added either as a slurry or solution in a suitable inert diluent which is subsequently removed either under reduced pressure, or elevated temperature, or both. The milling is effected for a suitable length of time which may be up to 100 hours or more but we prefer to use from 24 up to 70 hours. It will however be appreciated that a suitable length of time will be dependent on the intensity of the milling which, in the case of a rotating ball mill, will be dependent upon the type of mill and the speed of rotation of the mill. The milling may be effected at any suitable temperature, such as ambient temperature, but higher temperatures, such as 60° C, or lower temperatures, such as 0° C or lower, may be used.

The total amount (in moles) of component (3) and/or (4) used in the grinding should not exceed the number of moles of component (1).

It is preferred that the grinding is effected using from 0.01 up to 0.5, particularly from 0.05 up to 0.2 moles of components (3) and/or (4) for each mole of component (1). It is preferred that the final catalyst system contains a further quantity of component (3) and/or (4) in addition to that ground with component (1). This further quantity of component (3) and/or (4) is preferably from 0.5 up to 6 moles per mole of component (1), and particularly from 1 up to 2 moles per mole of component (1). The total quantity (in moles) of components (3) and (4) should be less than the number of moles of the organometallic compound which is component (2) of the catalyst system. The quantity of component (2) which is present in the catalyst system is, in general from 0.1 up to 20 moles per mole of component (1), and it is preferred to use from 0.5 up to 15, especially 1.0 up to 8.0 moles of component (2) per mole of component (1).

In addition to the four components (1), (2), (3) and (4), the catalyst may also include a substituted or unsubstituted polyene, the presence of which gives a further improvement in the polymerisation characteristics of the catalyst system. The polyene may be an acyclic polyene such as 3-methylheptatriene (1,4,6) or a cyclic polyene such as cyclooctatriene, cyclooctatetraene or particularly cycloheptatriene or may be a derivative of such polyenes. Such derivatives can be substituted with alkyl or alkoxy groups as in methylcycloheptatriene, dimethylcyclooctatetraene and methoxycycloheptatriene or may be tropylium salts, tropylium complexes, compounds of the type

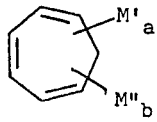

tropolone and its derivatives of the type

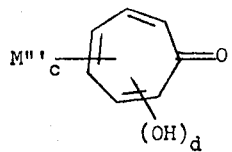 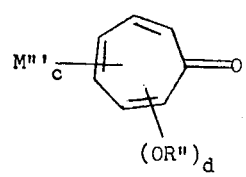

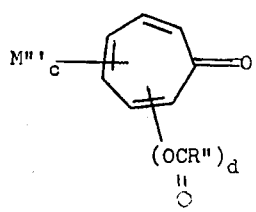

or tropones of the formula

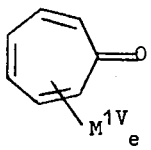

where
M' is hydrogen, halogen, or a hydrocarbyl group, particularly an alkyl group having 1 to 20 carbon atoms, an aryl group, an aralkyl or alkaryl group wherein the alkyl group has 1 to 20 carbon atoms or a condensed benzene ring having two carbon atoms in common with the cycloheptatriene ring;
M'' is a monovalent group containing at least one of the elements N, S or O;
M''' is a hydrocarbyl group of 1 to 20 carbon atoms, halogen or M'';
M$^{IV}$ is the same as M' and/or M'';
R'' is a hydrocarbyl group having 1 to 20 carbon atoms, which may be substituted with an alkoxy- or a hydrocarbyl-amino-group;
$a$ and $b$ are integers wherein $a + b \leq 7$ and usually 2 or less, particularly one;
$c$ and $d$ are integers wherein $c + d \leq 6$; and
$e$ is an integer wherein $e \leq 6$.
Tropylium salts and tropylium complexes are salts of cycloheptatriene which may be prepared by the process described in Dokl. akad. Nauk, USSR, 113, page 339 (1957). It will be appreciated that there are many derivatives of the type described including, for example methoxyethyltropylether

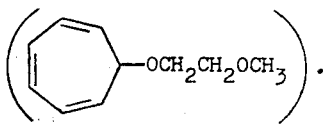

When the catalyst also includes a polyene, the molar proportions of the polyene plus components (3) and (4) should preferably, in total, be less than the number of moles of component (2) (the organo-metallic compound) which is present in the catalyst. For each mole of component (2), the number of moles of the polyene is conveniently in the range from 0.01 up to 1.0, especially 0.05 to 0.5, for example 0.2.

A preferred catalyst within the present invention comprises:

1. one molecular proportion of a titanium trichloride which has been modified by grinding with 0.05 to 0.2 molecular proportions of a tetra-alkyl diamine of the general formula $$R_2NC_nH_{2n}NR_2$$

or a phosphorus compound of the type R'$_3$P(O)

2. from 0.1 up to 20 molecular proportions of an aluminium trialkyl compound;

3. and/or (4) from 0.5 up to 6 molecular proportions of at least one of (3) a tetraalkyl diamine of the general formula $$R_2NC_nH_{2n}NR_2$$

or 4. a phosphorus compound of the type $$R'_3P(O); \text{ and}$$

5. from 0.01 up to 1.0 molecular proportions for each mole of component (2) of a substituted or unsubstituted cyclic polyene which is cyclooctatriene, cyclooctatetraene or cycloheptatriene or alkyl or alkoxyl derivatives thereof; wherein the total amount in moles of components (3), (4) and (5) does not exceed the amount in moles of component (2) and the material ground with the titanium trichloride and the material added as component (3) or (4) is such that the total catalyst system includes both the compound $$R_2NC_nH_{2n}NR_2$$

and $$R'_3P(O)$$

where each
- R, which may be the same or different is an alkyl group;
- $n$ is 1, 2 or 3; and
- each R', which may be the same or different, is a dialkylamino group or a hydrocarbyl group.

Catalysts in accordance with the present invention can be prepared by grinding at least one solid compound of a transition metal of Groups IVA to VIA with at least one compound of the type $$R_2NC_nH_{2n}NR_2 \text{ or } R'_3P(O),$$

mixing the ground product with at least one organometallic compound of aluminium or a non-transition metal of Groups IA or IIA and at least one compound of the type $$R_2NC_nH_{2n}NR_2 \text{ or } R'_3P(O)$$

and optionally at least one cyclic polyene, wherein the material ground with the transition metal compound and the materials mixed with the ground product are such that the catalyst includes at least one compound of the formula $$R_2NC_nH_{2n}NR_2$$

and at least one compound of the formula $$R'_3P(O)$$

where
- each R, which may be the same or different, is an alkyl group;
- $n$ is 1, 2 or 3; and
- each R', which may be the same or different, is a dialkylamino group or a hydrocarbyl group.

Catalysts in accordance with the present invention are particularly suitable for the polymerisation and copolymerisation of mono-α-olefines.

Thus, according to a further aspect of the present invention at least one mono-α-olefine, or a mixture of at least one mono-α-olefine and ethylene is contacted with a polymerisation catalyst comprising
1. at least one solid compound of a transition metal of Groups IVA to VIA;
2. at least on organo-metallic compound of aluminium or a non-transition metal of Groups IA or IIA;
3. at least one tetra-alkyl diamine of the general formula $$R_2NC_nH_{2n}NR_2$$

where each R, which may be the same or different, is an alkyl group; and
$n$ is 1, 2 or 3; and 4. at least one phosphorus compound of the general formula $$R'_3P(O)$$

where each R', which may be the same or different, is a dialkylamino group or a hydrocarbyl group; and wherein the component (1) has been modified by grinding it in the presence of at least one of the components (3) and (4), and the catalyst also optionally includes (5) a substituted or unsubstituted polyene.

Any mono-α-olefine monomer which is capable of being polymerised using a Ziegler catalyst may be polymerised by the process of the present invention. Thus, monomers which can be polymerised by the present process include butene-1, and 4-methylpentene-1 and particularly propylene. The olefines may be copolymerised either together or with ethylene, and such a copolymerisation is conveniently effected using a sequential polymerisation process as described in British Pat. Nos. 970 478; 970 479 and 1 014 944.

We have found that the process of the present invention can be used for the polymerisation of propylene to give a high yield of polymer relative to the amount of catalyst used and also a relatively low proportion of the undesirable soluble polymer.

It is well known that catalysts of the "Ziegler" type are susceptible to the effects of impurities and the activity and stereospecificity of such catalysts can be affected in a detrimental manner by the presence of small quantities of impurities, particularly oxygen and polar compounds such as water and alcohol in the monomer and/or diluent when used. Thus, for the polymerisation of olefine monomers using Ziegler catalysts, it is known to use pure monomers and diluents. However, when using catalysts in accordance with the present invention, snce they can be used in smaller proportions than the conventional Ziegler type catalyst, they are more susceptible to any impurities present in the system. Thus, for use with the catalyst of the present invention, we prefer that the monomers and any diluents which are of commercial purity, are subjected to a further purification procedure.

Any suitable purification treatment can be used and the treatment can be effected in more than one stage if desired. The particular purification treatment used will be dependent on the purity of the starting materials.

Satisfactory purity can be achieved in most cases by passing the monomer (and diluent, if used) through a bed of a material which is capable of absorbing the impurities contained in the monomer or diluent, for example as described in British Pat. Specification Nos. 1 111 493 and 1 226 659.

Using catalysts in accordance with the present invention, polymerisation can be carried out in the presence or absence of an inert diluent such as a suitably purified paraffinic hydrocarbon. If a diluent is not used, polymerisation can be effected in the liquid phase using excess liquid monomer as the suspension medium for catalyst and polymer product. If the monomer is used in the gaseous phase, polymerisation can be effected using any technique suitable for effecting a gas/solid reaction such as a fluidised bed reactor system.

Polymerisation may be effected either in a batch manner or on a continuous basis. The catalyst components may be introduced into the polymerisation vessel separately but it may be preferred, particularly if polymerisation is being effected on a continuous basis, to mix all the catalyst components together before they are introduced into the polymerisation reactor. Alternatively, in a batch polymerisation process, not all of the catalyst is added at the beginning of the polymerisation. Thus, a proportion of the catalyst may be added to initiate polymerisation and further quantities of one or more of the catalyst components are added at one or more times during the polymerisation. Conveniently at least 25% of each catalyst component is added to initiate polymerisation, the remaining catalyst components being added during the polymerisation. Since feeding a slurry of the solid transition metal compound may be inconvenient, it may be preferred that all of the solid transition metal compound is added, together with some of each of the other catalyst components, to initiate polymerisation and the rest of the other catalyst components are added during the polymerisation. It is desirable that in any mixing of the catalyst components the solid transition metal compound is not allowed to come into contact with components (3) and (4), other than in the grinding step, in the absence of the organometallic compound which is component (2) of the catalyst.

The polymerisation can be effected in the presence of a chain transfer agent such as hydrogen or a zinc dialkyl, in order to control the molecular weight of the product formed.

Using catalysts in accordance with the present invention which include a cyclic polyene, we have been able to polymerise propylene to obtain a high yield, relative to the amount of catalyst used, of a polymer having a high flexural modulus, for example 1.30 $GN/m^2$, which is comparable with that of commercially available propylene polymers which have been obtained in a lower yield and from which a catalyst removal step is necessary.

Various aspects of the present invention will now be described with reference to the following Examples which are illustrative of the invention.

EXAMPLES 1 to 5

The transition metal compound used was titanium trichloride TAC 131 sold by the Toho Titanium Company and believed to be obtained by the reduction of titanium tetrachloride with aluminium metal and subsequently ball-milling the product in the dry state.

133 gms of the titanium trichloride were introduced into a stainless steel ball mill, 9 inches long and 5.1 inches diameter containing 685 stainless steel balls of diameter 0.5 inches. Hexamethylphosphoric triamide (HMPT) was added as a solid in an amount calculated to give a molecular ratio HMPT/titanium trichloride of 0.167. The contents of the mill were shaken manually to disperse the HMPT over the particles of TAC 131 and the mill was rotated for 22 hours at 45 rpm. A nitrogen atmosphere was maintained in the mill at all times.

A polymerisation flask equipped with efficient stirrer and a water jacket was dried carefully and 1 liter of an inert hydrocarbon diluent (mainly $C_{12}$ isomers having a boiling range of about 170° to 175° C) was introduced. The diluent was evacuated at 60° C, purged with nitrogen and evacuated, which treatment effectively reduced the water and oxygen contents of the diluent to below 10 ppm by weight. The diluent was then saturated with propylene to one atmosphere pressure.

The propylene had been purified by passing gaseous propylene, in turn, through a column (3 inches diameter, 3 feet in length) containing 1/16 inch granules of Alcoa F1 alumina at 50°–60° C, and then through a similar column containing BTS catalyst (Cupric oxide reduced to finely divided metallic copper on a magnesium oxide support) at 40°–50° C, condensing the issuing gas and passing the liquid propylene through four columns (all 3 inches diameter; two of 3 feet in length and two of 6 feet in length) at 25° C, each containing 1/16 inch pellets of Union Carbide 3A molecular sieves. This treatment reduced the water content of the monomer from 5–10 ppm by volume to <1 ppm by volume, and the oxygen content from 1–2 ppm by volume to <0.5 ppm by volume. The level of inert compounds (nitrogen, ethane, etc.) was unchanged at 0.3% by volume and the level of unsaturated hydrocarbons (allene, methylacetylene, etc.) was unchanged at <1 ppm by volume.

A diamine was added and 8 mmol of triethyl aluminium and the contents of the reaction vessel were stirred for 30 minutes before adding 2 mmol of the milled titanium trichloride material. The pressure in the reaction vessel was maintained at one atmosphere by the supply of propylene from a burette. After a period of 2.5 hours from the introduction of the titanium trichloride the run was terminated by the addition of 10 ml of isopropanol and a sample of supernatant liquid extracted for determining the concentration of soluble polymer. The solid was filtered, washed 3 times with petrol ether and dried in a vacuum oven at 120° C for an hour. The yield of solid plus calculated soluble polymer equalled within experimental error the propylene lost from the burette.

The conditions used and the results obtained are set out in Table 1. Comparative examples, indicated by letters, were carried out in a similar manner either by omitting the diamine or using a different amine.

TABLE 1

| Example or Comparative Example | Amine Type (a) | mMol/l | Yield of Polymer (g/mMol) (b) | % of Soluble Polymer (c) |
|---|---|---|---|---|
| 1 | TMMD | 1 | 26.0 | 1.7 |
| 2 | TMED | 1 | 37.0 | 2.65 |
| 3 | TMED* | 2 | 28.5 | 2.7 |
| 4 | TMED* | 4 | 23.5 | 2.2 |
| 5 | TMPD | 1 | 35.0 | 4.3 |
| 6 | TEED | 1 | 21.5 | 3.6 |
| A | — | NIL | 39.5 | 7.8 |
| B | IQ | 1 | 37.5 | 6.5 |
| C | IQ | 4 | 42.5 | 5.1 |
| D | IQ | 5 | 15.0 | 5.0 |
| E | PEA | 1 | 24.5 | 5.6 |

(a) TMMD is N,N,N′,N′-tetramethylmethylenediamine TMED is N,N,N′,N′-tetramethylethylenediamine TMPD is N,N,N′,N′-tetramethylpropylenediamine TEED is N,N,N′,N′-tetraethylethylenediamine IQ is isoquinoline PEA is 2(α-pyridyl)ethylamine
(b) Based on solid polymer only
(c) % based on total polymer (solid + soluble)formed
*In these experiments an extra 4 mMol of triethyl aluminium was used.

EXAMPLES 7 to 14

A further series of polymerisations were carried out as described in Examples 1 to 6 using different types of titanium trichloride which had been modified by grinding under a range of conditions with various phosphorus compounds or diamines.

The results of the various examples and comparative examples are set out in Table 2.

TABLE 2

| Example or Comparative Example | Type of TiCl₃ (d) | Phosphorus Compound or Diamine Type (a) | mMol/l | Yield of Polymer (g/mMol) (b) | % of Soluble Polymer (c) |
|---|---|---|---|---|---|
| 7 | I | TMMD | 1.0 | 49.5 | 4.6 |
| 8 | I | TMED | 1.0 | 37.0 | 3.8 |
| F | I | — | NIL | 64.0 | 10.1 |
| G | I | IQ | 1.0 | 63.5 | 9.0 |
| H | I | IQ | 3.0 | 58.0 | 6.7 |
| J | I | IQ | 4.0 | 31.0 | 4.75 |
| 9 | II | HMPT | 4.0 | 47.0 | 2.0 |
| K | II | — | NIL | 53.5 | 14.4 |
| 10 | III | TMED | 1.0 | 34.5 | 2.8 |
| L | III | — | NIL | 53.5 | 8.5 |
| M | III | IQ | 3.0 | 56.0 | 5.7 |
| 11 | IV | TMMD | 1.0 | 55.0 | 2.5 |
| 12 | IV | TMED | 1.0 | 51.7 | 2.0 |
| 13 | IV | TMED | 2.0 | 33.0 | 1.6 |
| N | IV | — | NIL | 68.0 | 6.5 |
| 14 | V | TMED | 1.0 | 51.5 | 2.7 |
| O | V | — | NIL | 55.0 | 11.0 |
| P | V | IQ | 3.0 | 78.5 | 6.9 |
| R | V | IQ | 4.0 | 61.0 | 8.4 |
| S | V | Pic | 1.0 | 72.5 | 10.6 |
| T | V | Pic | 4.0 | 72.5 | 10.0 |
| U | V | Pic | 8.0 | 61.5 | 9.3 | a) TMMD, TMED and IQ are as defined in Table 1. HMPT is hexamethylphosphoric triamide. Pic is α-picoline.

b)
c) } as defined in Table 1.

d) I The TiCl₃ was Toho TAC 101 which had been milled with hexamethylphosphoric triamide (HMPT) in an argon atmosphere. The mill used was 6 inches long and 3⅛ inches diameter with lifters and containing 200 stainless steel balls of diameter 0.5 inches. 20 grammes of TAC 101 were slurried in 50–70 mls of pentane under argon, and HMPT were added to the well shaken slurry over 10 to 15 minutes, the slurry was shaken for a further 30 minutes to one hour and transferred to the mill and the pentane was removed under vacuum, at 40–50° C, over a period of 2 to 3 hours. Argon was introduced into the mill which was then revolved at 66 rpm for 91 hours. The HMPT was used in an amount to give a ratio (confirmed by nitrogen analysis )HMPT:TAC 101 of 0.11. II The TiCl₃ was Toho TAC 101 which had been milled with N,N,N′,N′-tetramethylethylenediamine (TMED) in an argon atmosphere. The mill used was 5.5 inches long, and 5⅛ inches diameter with lifters and contained 56 stainless steel balls of 1 inch diameter. The procedure of preparing the catalyst system and milling was as in I except that the nominal ratio TMED:TAC 101 was 0.055, and milling was effected at 80 rpm for 64.5 hours. III The TiCl₃ was Toho TAC 121 which had been milled with HMPT in an argon atmosphere. The mill was as described for I but contained 20 stainless steel balls of 0.5 inches diameter and 200 stainless steel balls of 0.25 inches diameter. Milling was effected for 48 hours at 120 rpm. The nominal ratio HMPT:TAC 121 was 0.11 and the ratio measured by nitrogen analysis was 0.093. IV The TiCl₃ was Toho 121 which had been milled with HMPT in a nitrogen atmosphere. The mill used was 9 inches long and 5.1 inches diameter and contained 685 stainless steel balls of 0.5 inches diameter. The TAC 121 was added directly to the mill followed by the HMPT, the mill was shaken manually and milling was effected for 119 hours at 64 rpm. The nominal ratio HMPT:TAC 121 was 0.166, and as measured by nitrogen analysis was 0.142. V The TiCl₃ was Toho TAC 121 which had been milled with triphenyl phosphine oxide (TPPO) in a nitrogen atmosphere. The mill was as described for IV. Milling was effected for 65 hours at 64 rpm. The nominal ratio TPPO:TAC 121 was 0.166.

EXAMPLES 15 and 16

Polymerisation was carried out as described in Examples 1 to 6 using a different form of TiCl₃ and in Example 16 cycloheptatriene was also incorporated as a component of the catalyst.

The titanium trichloride used was Stauffer TiCl₃—AA grade titanium trichloride which had been milled with HMPT in a nitrogen atmosphere. The mill used was 5.5 inches long and 5⅛ inches diameter with lifters and contained 400 stainless steel balls of 0.5 inches diameter and 400 stainless steel balls of 0.25 inches diameter. The TiCl₃—AA was charged to the mill which was rotated for 66 hours at 60 rpm. HMPT was added to give a nominal ratio HMPT:TiCl₃—AA of 0.165 (Ratio found by nitrogen analysis was 0.155). The HMPT was added in steps to the revolving mill from a Cornwall syringe, 0.33 of the total HMPT being added after 1 hour, 25 hours and 44 hours of milling respectively.

In Example 16, the cycloheptatriene was added with TMED and triethyl aluminium and all three components were mixed for 30 minutes before adding the milled titanium trichloride.

The results obtained are set out in Table 3.

TABLE 3

| Example or Comparative Example | Amount TMED (a) (mMol/l) | Amount CHT (e) (mMol/l) | Yield of Polymer (g/mMol) (b) | % of Soluble Polymer (c) |
|---|---|---|---|---|
| 15 | 1.0 | NIL | 44.5 | 2.1 |
| 16 | 1.0 | 1.0 | 29.0 | 1.2 |
| V | NIL | NIL | 56.0 | 5.5 | a) TMED is as defined in Table 1 b)
c) } As defined in Table 1 e) CHT is cycloheptatriene.

EXAMPLES 17 and 18

The titanium trichloride was TAC 191 which had been modified by grinding with hexamethylphosphoric triamide (HMPT) in a quantity sufficient to give a nominal molar ratio TAC 191:HMPT of 6:1.

The mill used was a stainless steel mill of 13 cm diameter and 23 cm long, provided with six pairs of wire baffles. The mill contained about 700 stainless steel balls of 0.5 inches in diameter. The mill was evacuated to vacuum and purged with nitrogen, this procedure being effected a total of six times. 131 gm of TAC 191 was added to the mill as a solid, the mill was rotated for 10 minutes at 60 rpm. Whilst the mill was rotating, 19.6 gm of hexamethylphosphoric triamide was added from a syringe over a period of 4 to 5 minutes. Milling was then continued for 24 hours at 60 rpm. The molar ratio of TiCl₃:HMPT in the milled product was found by phosphorus analysis to be 5.6:1.

Polymerisation was carried out in a stainless steel autoclave, of total capacity 8 liters, which was fitted with a vertical anchor stirrer. The autoclave was heated to 70° C, evacuated, and the vacuum was released with propylene. The autoclave was then evacuated and the procedure repeated 5 times. A solution of aluminium triethyl (8 gm millimoles) in heptane (6.5 ml) was mixed with 1,3,5-cycloheptatriene and N,N,N′,N′-tetramethylethylenediamine. This mixture was injected into the above-described autoclave containing propylene gas at 35° C and 2 psi gauge. One gram millimole of titanium trichloride as a suspension in dry n-heptane of the titanium trichloride milled as described above was injected into the autoclave and then, within 5–10 seconds, 5 liters of liquid propylene were added, the stirrer being operated at 150 rpm. This propylene addition was effected by allowing 5.5 liters of liquid propylene to transfer from a burette at 50° C to the autoclave. Hydrogen (200 gram millimoles) was added and the temperature of the autoclave contents was raised to 65° C over 10 minutes. The hydrogen was commercially available hydrogen (99.99% pure) which had been further purified by passing through a column (8 inches by 4 feet in length) containing a molecular sieve material (Union Carbide 3A) at 20° C. The hydrogen was stored in the sieve column and drawn off as required. Polymerisation was allowed to proceed at a temperature of 65° C and a pressure of 410 psi gauge. More hydrogen (20 gram millimoles on each occasion) was added after 10, 25, 45, 80 and 120 minutes from the time of the first hydrogen addition. After 2½ hours of polymerisation the autoclave was vented over a period of 10 minutes to remove unpolymerised propylene, and a free-flowing, grey powder was obtained. The polymerisation conditions are set out in Table 4. In all examples the catalyst comtained 1 gm millimole of $TiCl_3$ and 8 gm millimoles of aluminium triethyl.

TABLE 4

| Example or Comparative Example | Amount TMED (a) (mMol/l) | Amount CHT (e) (mMol/l) | Conversion (f) (g/mM of $TiCl_3$) |
| --- | --- | --- | --- |
| 17 | 0.4 | 0.8 | 825 |
| 18 | 0.8 | 0.8 | 1060 |
| W** | NIL | NIL | 1550 | a) TMED is as defined in Table 1
e) CHT is as defined in Table 3
f) Based on yield of polymer and quantity of $TiCl_3$ nominally used
**In this polymerisation the polymerisation time was 2 hours 20 minutes.

The properties of the polymers obtained were then determined. The flexural modulus was measured using a cantilever beam apparatus as described in Polymer Age, March 1970, pages 57 and 58. The deformation of a test strip at 1% skin strain after 60 seconds at 23° C and 50% relative humidity was measured. The test strip which had dimensions of approximately 150 × 19 × 1.6 mm was prepared by mixing 23 g of the polymer with 0.1% by weight of an antioxidant ('Topanol' CA), and adding the mixture to a Brabender Plasticiser, at 190° C, 30 rpm and under a load of 10 kg to convert it to a crepe. The crepe was placed within a template, between aluminium foil and pressed by means of an electric Tangye Press at a temperature of 250° C. The pressing was preheated for a period of 6 minutes, under just enough pressure to make the polymer flow across the template, that is an applied force of about 1 ton. After the preheat period, the applied force was raised to 15 tons in 5 ton increments, de-gassing (that is releasing pressure) every 5 tons. After 2 minutes at 15 tons, the press was cooled by means of air and water for 10 minutes or until room temperature was reached.

The plaque was then cut into strips of dimensions 150 × 19 × 1.6 mm. Duplicate strips of each polymer were placed into an annealing oven at 130° C, and after 2 hours at this temperature the heat was switched off and the oven cooled to ambient temperature at 15° C per hour.

The melt flow index was measured by ASTM Test Method D 1238-70, Condition N (190° C and 10 kgm). The fraction of polymer soluble in boiling heptane was determined by Soxhlet extraction for 16 hours using about 150 mls of heptane and 5 gms of polymer. The Ti contents of the polymers were calculated from the yield of polymer relative to catalyst and also were determined experimentally by X-ray fluorescence spectrometry using incident X-rays obtained from a chrome anode.

The results obtained are set out in Table 5.

TABLE 5

| Example or Comparative Example | Ti(ppm) Calc | Ti(ppm) Found | Calc Cl (g) ppm | % Wt Hot Heptane Soluble Polymer (h) | Flex Modulus (GN/m²) (j) | MFI (k) |
| --- | --- | --- | --- | --- | --- | --- |
| 17 | 65 | 70 | 210 | 7.2 | 1.33 | 22.5 |
| 18 | 45 | 70 | 210 | 5.8 | 1.29 | 4.8 |

TABLE 5-continued

| Example or Comparative Example | Ti(ppm) Calc | Ti(ppm) Found | Calc Cl (g) ppm | % Wt Hot Heptane Soluble Polymer (h) | Flex Modulus (GN/m²) (j) | MFI (k) |
| --- | --- | --- | --- | --- | --- | --- |
| W | 31 | 32 | 96 | 24.2 | 0.70 | 25 | g) 3 times the amount of Ti found
h) Measured by Soxhlet extraction with boiling heptane for 16 hours
j) Measured as indicated using the apparatus described in Polymer Age, March 1970, Pages 57 and 58
k) Measured according to ASTM Test Method D 1238-70 Condition N.

In all the foregoing examples and comparative examples, unless otherwise indicated, all operations, including milling, until the termination of the polymerisation were carried out in a nitrogen atmosphere.

EXAMPLE 19

The polymerisation procedure of Example 18 was repeated using as the $TiCl_3$ component, a sample of Stauffer $TiCl_3$—AA which had been ball-milled with hexamethylphosphoric triamide. The mill used was of stainless steel and 14 cm long and 12.7 cm in diameter. The mill contained 100 stainless steel balls of 12.7 mm diameter and 100 stainless steel balls of 19.1 mm diameter. 190.6 gm of $TiCl_3$—AA were introduced into the mill which had previously been purged with nitrogen. The mill was rotated for 1 hour at 60 rpm and then, whilst the mill was still rotating, 9 mls of neat hexamethylphosphoric triamide were introduced into the mill, from a syringe, over a period of about 5 minutes. The mill was rotated for a further 24 hours and a further 9 mls of hexamethylphosphoric triamide was added. The mill was rotated for 19 hours more and 9.9 mls of hexamethylphosphoric triamide were added. The mill was then rotated for a further 22 hours to give a total milling time of 66 hours. The molar ratio of $TiCl_3$ to hexamethylphosphoric triamide was found, by analysis, to be 6.4 to 1. The results obtained are set out in Table 6.

EXAMPLE 20

The procedure of Example 19 was repeated except that the ball-milling conditions were different. 141.4 gms of Stauffer $TiCl_3$—AA were milled with 13.9 mls of hexamethylphosphoric triamide at 60 rpm for 64 hours. All of the hexamethylphosphoric triamide was added as a single addition at the start of the milling. The molar ratio of $TiCl_3$ to hexamethylphosphoric triamide was found, by analysis, to be 8.8 to 1. The results obtained are set out in Table 6.

TABLE 6

| Example | Conversion (f) (g/mM of $TiCl_3$) | Ti (ppm Found) | % Weight Residual Soluble Polymer (l) | Flex Modulus (GN/m²) (j) | MFI (k) |
| --- | --- | --- | --- | --- | --- |
| 19 | 775 | 76 | 8.0 | 1.23 | 10.0 |
| 20 | 730 | 69 | 8.2 | 1.19 | 5.4 |

(f) As defined in Table 4(j) and (k) As defined in Table 5
(1) The proportion of residual soluble polymer was determined by adding 1 gram of solid polymer to 50 ml of the hydrocarbon liquid used as the polymerisation diluent in Examples 1 to 16. The mixture was heated to 185° C and this temperature was maintained until the polymer had fully dissolved. The solution was cooled to 60° C and maintained at this temperature, with stirring, for 18 hours. The precipitated polymer was separated by filtration at 60° C and the proportion of polymer which remained dissolved in the diluent determined by evaporating the solution to dryness.

I claim:

1. An olefine polymerisation catalyst comprising
   1. at least one solid halide compound of transition metal of Groups IVA to VIA
   2. at least one organo-metallic compound of aluminium or of a non-transition metal of Groups IA or IIA;
   3. at least one tetra-alkyl diamine of the general formula
      $R_2NC_nH_{2n}NR_2$ where each R, which may be the same or different, is an alkyl group; and $n$ is 1, 2 or 3; and
   4. at least one phosphorus compound of the general formula $R'_3P(O)$, where each R', which may be the same or different, is a dialkylamino group or a hydrocarbyl group;
   wherein for each mole of component (1) there is present
      a. from 0.1 up to 20 moles of component (2), and
      b. from 0.5 up to 6 moles of component (3) and/or component (4),
   which quantity of component (3) and/or component (4) has not been ground with component (1), and the total quantity of moles of components (3) and (4) is less than the number of moles of the organo-metallic compound which is component (2); and component (1) has been modified by grinding it in the presence of at least one of the components (3) and (4) in an amount of from 0.01 up to 0.5 moles of components (3) and/or (4) for each mole of component (1).

2. The catalyst of claim 1 which also includes a substituted or unsubstituted polyene in an amount in the range from 0.01 up to 1.0 moles per mole of component (2).

3. The catalyst of claim 1 wherein the transition metal compound is titanium trichloride and component (2) is an aluminium trihydrocarbyl or a mixture of an aluminium trihydrocarbyl and an aluminium dihydrocarbyl halide.

4. The catalyst of claim 1 wherein in component (3) the groups R are all the same and are methyl or ethyl groups, and in component (4) the groups R' are all the same and are dimethylamino- or phenyl groups.

5. The catalyst of claim 2 wherein the polyene is cyclooctatriene, cyclooctatetraene or cycloheptatriene or an alkyl or alkoxy derivative thereof, and the amount of the polyene is in the range from 0.01 up to 1.0 moles per mole of component (2).

6. A process for the production of an olefin polymerization catalyst which comprises grinding at least one solid halide of a transition metal of Groups IVA to VIA with at least one compound of the type (3) $R_2NC_nH_{2n}NR_2$, or (4) $R'_3P(O)$ in an amount of from 0.01 up to 0.5 moles of components (3) and/or (4) for each mole of component (1), and mixing the ground product with at least
   (2) one organo-metallic compound of aluminum or of a non-transition metal of Groups IA or IIA, and at least one compound of the type (3) $R_2NC_nH_{2n}NR_2$ or (4) $R'_3P(O)$;

the mixing being effected in amounts such that there are present, in the catalyst, for each mole of component (1) which is present in the ground product,
   a. from 0.1 up to 20 moles of component (2), and
   b. from 0.5 up to 6 moles of component (3) and/or (4), and the total quantity, in moles, of components (3) and (4) is less than the number of moles of the organo-metallic compound which is component (2);
wherein the material ground with the transition metal halide and the materials mixed with the ground product are such that the catalyst includes at least one compound of the formula $R_2NC_nH_{2n}NR_2$ and at least one compound of the formula $R'_3P(O)$ wherein each R, which may be the same or different, is an alkyl group;
   $n$ is 1, 2 or 3; and
   each R', which may be the same or different, is a dialkylamino group or a hydrocarbyl group.

7. The process of claim 6 which comprises mixing the ground product with the organo-metallic compound before adding the compound
   $R_2NC_nH_{2n}NR_2$ or $R'_3P(O)$.

8. In a process for the production of an olefin polymer which comprises contacting at least one mono- α-olefin, or a mixture of at least one mono- α-olefin and ethylene, with an olefin polymerization catalyst, the improvement which consists of using, as the polymerization catalyst, the catalyst of claim 1.

9. The process of claim 8 which comprises effecting polymerization in the liquid phase using an excess of liquid monomer as the suspension medium for catalyst and polymer product.

* * * * *

UNITED STATES PATENT OFFICE
CERTIFICATE OF CORRECTION

Patent No. 3,989,641                    Dated November 2, 1976

Inventor(s) James Frank Robert Jaggard

It is certified that error appears in the above-identified patent and that said Letters Patent are hereby corrected as shown below:

IN THE SPECIFICATION:

Column 9, Table 2 at footnote d), line 17 thereof, please change "20" to read --200--.

Signed and Sealed this

Fifth Day of April 1977

[SEAL]

Attest:

RUTH C. MASON
Attesting Officer

C. MARSHALL DANN
Commissioner of Patents and Trademarks